US010355253B2

(12) United States Patent
Agliata

(10) Patent No.: US 10,355,253 B2
(45) Date of Patent: *Jul. 16, 2019

(54) RECLOSER BATTERY ASSEMBLY WITH HOT STICK ADAPTOR AND BATTERY TUBE ADAPTOR

(71) Applicant: Hubbell Incorporated, Shelton, CT (US)

(72) Inventor: Peter M. Agliata, Birmingham, AL (US)

(73) Assignee: Hubbell Incorporated, Shelton, CT (US)

( * ) Notice: Subject to any disclaimer, the term of this patent is extended or adjusted under 35 U.S.C. 154(b) by 245 days.

This patent is subject to a terminal disclaimer.

(21) Appl. No.: 15/584,932

(22) Filed: May 2, 2017

(65) Prior Publication Data

US 2017/0317320 A1    Nov. 2, 2017

Related U.S. Application Data

(60) Provisional application No. 62/330,355, filed on May 2, 2016.

(51) Int. Cl.
*H01M 2/34* (2006.01)
*H02J 7/00* (2006.01)
(Continued)

(52) U.S. Cl.
CPC .......... *H01M 2/043* (2013.01); *H01H 31/006* (2013.01); *H01H 75/04* (2013.01);
(Continued)

(58) Field of Classification Search
CPC ............. H01M 2/043; H01M 2200/00; H01M 2200/20; H01M 2/34; H01M 2/1016;
(Continued)

(56) References Cited

U.S. PATENT DOCUMENTS 2,542,132 A * 2/1951 Goertzen ............... H01H 35/02
200/61.51
4,581,504 A * 4/1986 Hamel, Sr. ........... H01H 35/146
200/61.08

(Continued)

OTHER PUBLICATIONS

Versa-Tech Single-Phase Recloser for Distribution Systems, Hubbell. Maintenance Manual. Mar. 30, 2015 <URL: http://www.hubbellpowersystems.com/resources/instructions/chance-construction/pdf/PSP862-0311.pdf> (41 pages).

(Continued)

*Primary Examiner* — Muhammad S Siddiquee
(74) *Attorney, Agent, or Firm* — Michael Best & Friedrich, LLP

(57) ABSTRACT

A circuit interrupting device for use with an electrical power distribution system includes a housing containing a circuit interrupting device. A battery tube is positioned in the housing. A battery assembly is configured to be inserted into the battery tube. The battery assembly includes a assembly body having a first end and a second end. A battery is positioned in the assembly body. A cap assembly is connected to the assembly body and configured to connect the battery assembly to the battery tube. The cap assembly includes a torque-limiting device that prevents overtightening of the cap to the battery tube.

20 Claims, 13 Drawing Sheets

(51) Int. Cl.
  *H01R 11/22* (2006.01)
  *H01M 2/04* (2006.01)
  *H02J 7/24* (2006.01)
  *H01H 75/04* (2006.01)
  *H01H 31/00* (2006.01)
  *H02H 7/26* (2006.01)
  *H01M 2/02* (2006.01)
  *H01R 4/22* (2006.01)
  *H01R 11/14* (2006.01)
  *F16B 31/02* (2006.01)
  *H01M 2/10* (2006.01)

(52) U.S. Cl.
  CPC .............. *H01M 2/34* (2013.01); *H02H 7/26* (2013.01); *H02J 7/0026* (2013.01); *H02J 7/241* (2013.01); *F16B 31/027* (2013.01); *H01M 2/022* (2013.01); *H01M 2/1016* (2013.01); *H01M 2200/00* (2013.01); *H01M 2200/20* (2013.01); *H01R 4/22* (2013.01); *H01R 11/14* (2013.01)

(58) Field of Classification Search
  CPC ....... H01M 2/022; H02H 7/26; H01H 31/006; H01H 75/04; H02J 7/241; H02J 7/0026; H01R 11/14; H01R 4/22; F16B 31/027
  See application file for complete search history.

(56) References Cited

U.S. PATENT DOCUMENTS

| | | | | |
|---|---|---|---|---|
| 4,956,755 | A * | 9/1990 | Maglica | F21L 4/005 362/206 |
| 5,378,549 | A * | 1/1995 | Eylon | H01M 2/1055 429/1 |
| 6,794,596 | B2 | 9/2004 | Rhein et al. | |
| 2002/0179571 | A1* | 12/2002 | Rhein | H01H 33/6662 218/7 |
| 2004/0008510 | A1* | 1/2004 | Mah | F21L 13/06 362/192 |
| 2004/0144757 | A1 | 7/2004 | Rhein et al. | |
| 2009/0016050 | A1 | 1/2009 | Opolka | |
| 2010/0177507 | A1* | 7/2010 | West | H01M 2/1055 362/183 |

OTHER PUBLICATIONS

PCT/US2017/030640 International Search Report and Written Opinion dated Sep. 22, 2017 (12 pages).
U.S. Appl. No. 15/584,917, filed May 2, 2017 entitled "Recloser Battery Assembly".
U.S. Appl. No. 15/584,928, filed May 2, 2017 entitled "Recloser Battery Assembly With Torque-Limiting Cap".

* cited by examiner

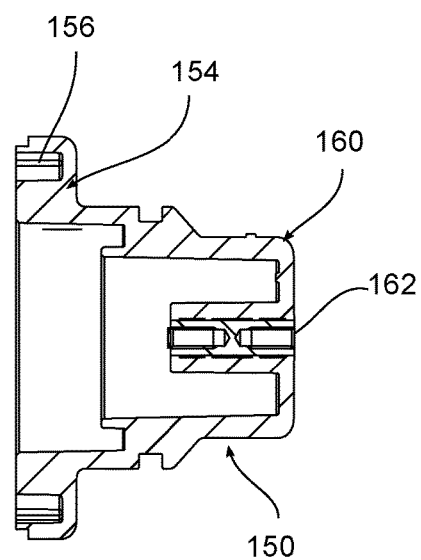
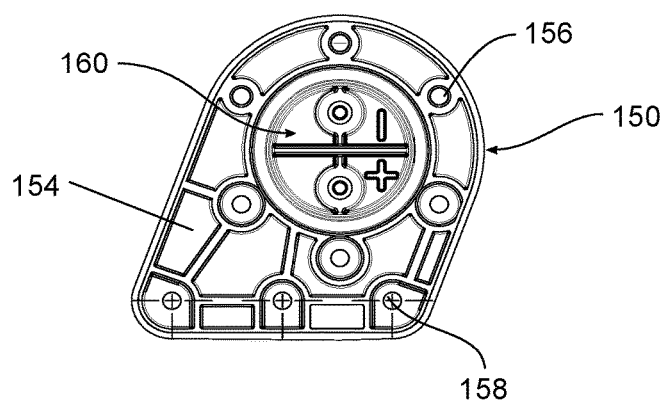
FIG.18
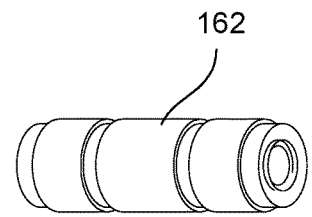
FIG.20
FIG.19
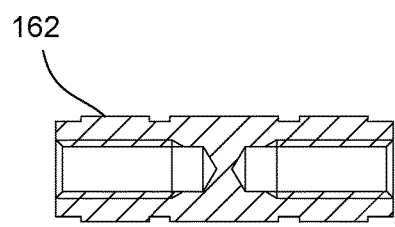
FIG.21

RECLOSER BATTERY ASSEMBLY WITH HOT STICK ADAPTOR AND BATTERY TUBE ADAPTOR

RELATED APPLICATION(S)

This application is based on U.S. provisional application Ser. No. 62/330,355, filed May 2, 2016, the disclosure of which is incorporated herein by reference in its entirety and to which priority is claimed.

FIELD

Various exemplary embodiments relate to a battery tube for a utility line circuit interrupter such as a recloser.

BACKGROUND

Conventional circuit interrupting devices, such as circuit breakers, and reclosers, provide protection for power distribution systems and the various apparatus on those power distribution systems by isolating a faulted section from the upstream power source in the system. Fault current, or momentary current surges, in the system may occur under various conditions, including lightning, an animal or tree contacting the power lines, or adjacent power lines contacting each other. For example, windy conditions often cause power lines strung between poles to swing, thereby momentarily touching each other or a grounded conductor. These types of transitory events cause momentary power line short circuits that in turn cause fuses to burn or circuit breakers to trip.

Most of the faults occurring on the line are transient faults, as opposed to permanent faults, and do not require permanent protection. Therefore, reclosers are a common solution for clearing these types of transient faults without causing a permanent power outage. Reclosers are typically mounted to support structures in electrical power distribution systems to provide continuous electrical service up to a programmed current threshold. Reclosers detect faults, i.e., overcurrent events past the programmed threshold, and interrupt the load current when the overcurrent event persists for a predetermined amount of time which is determined by the overcurrent value. If the recloser operates and temporarily interrupts the load current, it will automatically restore service after the transient fault condition is gone. If a fault is permanent, the recloser locks out, i.e., permanently opens the circuit, after a preset number of operations, thereby isolating the faulted section of the system.

SUMMARY

According to an exemplary embodiment, a circuit interrupting device for use within a power distribution system includes a housing containing a circuit interrupting mechanism. A battery tube is removably connected to a battery chamber. A battery assembly is configured to be connected to the battery tube. The battery assembly includes a assembly body having a first end and a second end. A battery positioned in the assembly body. A cap is connected to the assembly body and configured to connect the battery assembly to the battery tube.

According to another exemplary embodiment, a circuit interrupting device for use with an electrical power distribution system includes a housing having a circuit interrupting mechanism and a battery chamber. A battery tube is releasably connected to the battery chamber and has a first connector. A battery assembly is configured to be inserted into the battery tube. The battery assembly includes a cap having second connector configured to couple to the first connection to form a secure connection. A hot-stick adaptor includes an interior receiving portion capable of receiving at least a portion of the cap and a connecting portion configured to connect to a hot-stick.

According to another exemplary embodiment, a circuit interrupting device for use within a power distribution system includes a housing containing a circuit interrupting mechanism and a battery chamber. An adaptor plate is configured to be connected to the housing and extend at least partially into the battery chamber. An adaptor tube is configured to be connected to the adaptor plate. A battery tube is configured to be connected to the battery chamber and is further configured to be connected to the adaptor tube. A battery assembly is configured to be inserted into the battery tube.

BRIEF DESCRIPTION OF THE DRAWINGS

The aspects and features of various exemplary embodiments will be more apparent from the description of those exemplary embodiments taken with reference to the accompanying drawings, in which:

FIG. 18 is a side view of the adaptor plate of FIG. 16;

FIG. 19 is a top sectional view of FIG. 18;

FIG. 20 is a perspective view of an exemplary contact;

FIG. 21 is a sectional view of FIG. 20; and

DETAILED DESCRIPTION OF EXEMPLARY EMBODIMENTS

Figure 1:
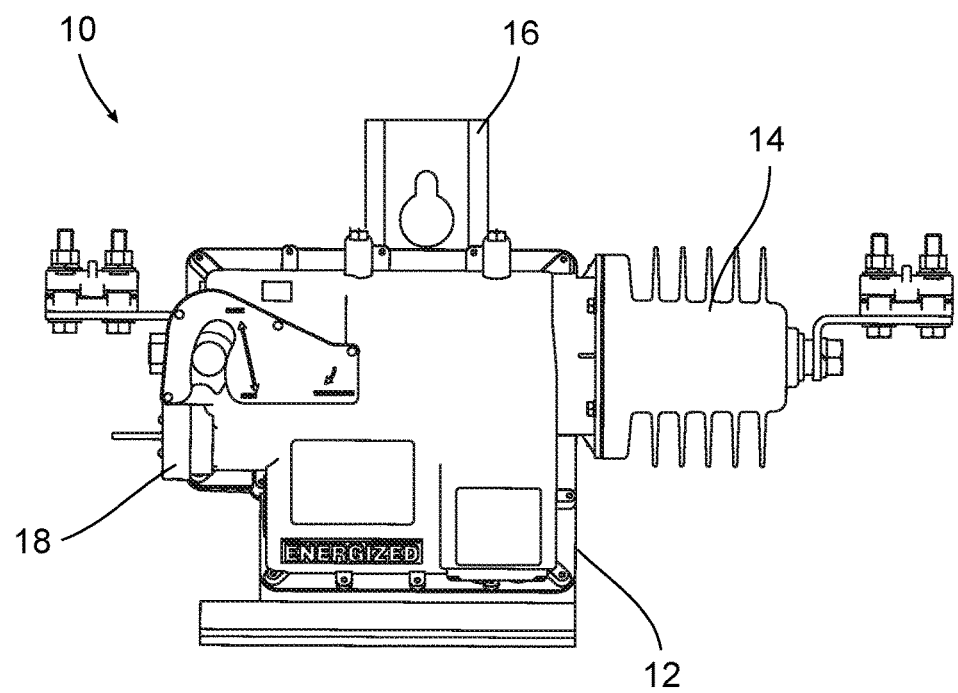
FIG. 1 is a front view of an exemplary automatic recloser.

FIG. 1 shows, a circuit interrupting device for a power distribution system, such as an automatic recloser 10, although certain aspects of the circuit interrupting device can be incorporated into other circuit interrupting devices, such as circuit breakers that do not reclose. The recloser 10 generally includes a housing 12 containing a circuit interrupting mechanism 14 used in conjunction with an actuator, which is electrically controlled by an electronic control assembly. The circuit interrupting mechanism 14 is preferably a vacuum interrupter, but can be any type of interrupting means such as SF6 gas interrupter or a solid dielectric interrupter. The actuator is preferably a solenoid, but may be any known electrical or mechanical actuating or operating mechanism. The recloser 10 can include a mounting bracket 16 for mounting the housing 12 to a utility pole or other structure.

A battery 18 can be used, for example, as a power source for the electronic control assembly in order to close the vacuum interrupter contacts, such as when initially installing the recloser 10 and after lock-out due to a permanent fault. The battery 18 can be used for other purposes as well, such as powering peripheral devices coupled to the recloser or providing power to external indicators, such as external visual indicators. The battery 18 is received within the housing 12 and removably secured thereto. Additional components and operation of the recloser 10 as understood by one of ordinary skill in the art are further described in U.S. Pat. No. 6,794,596, which is hereby incorporated by reference in its entirety.

Figure 2:
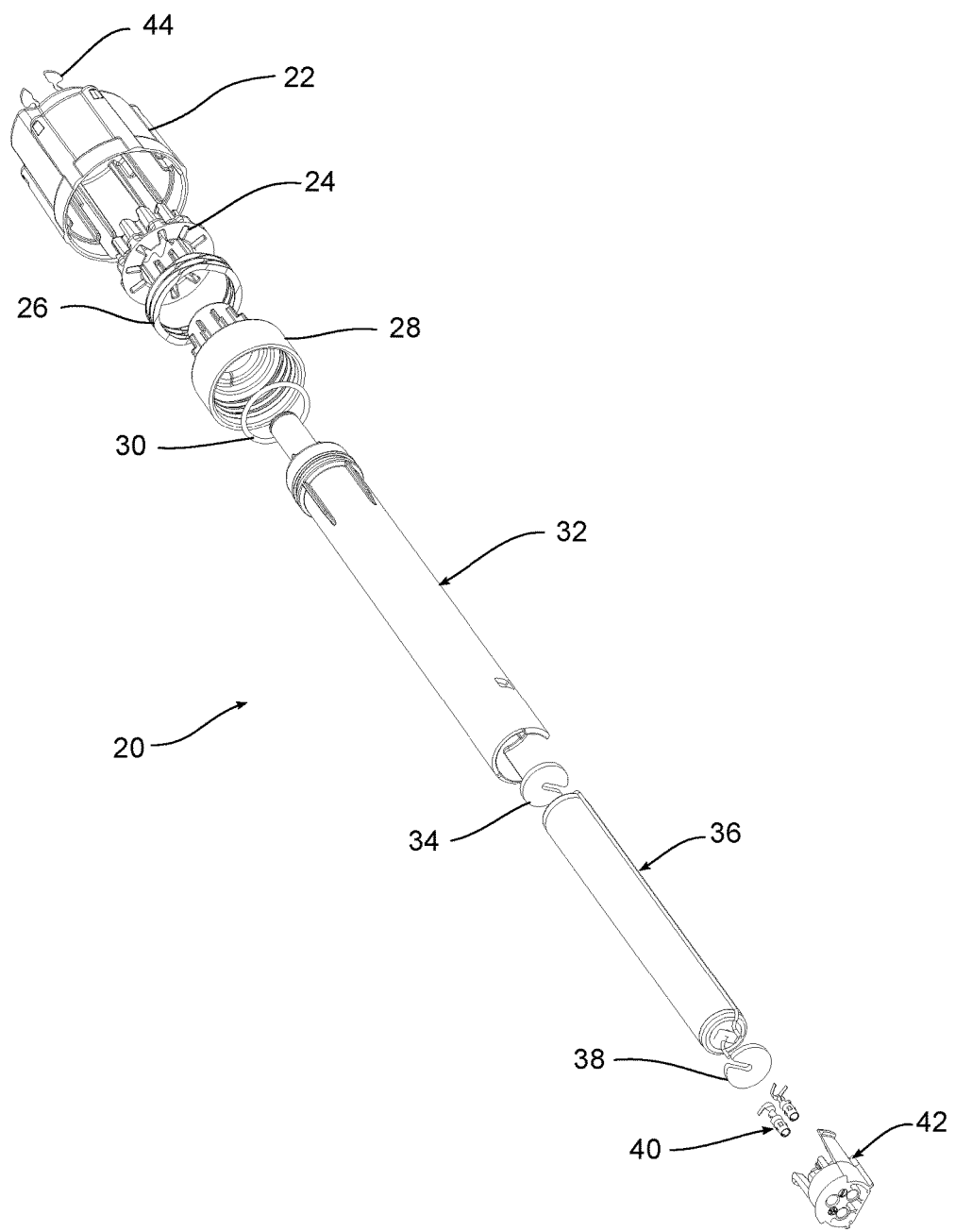
FIG. 2 is an exploded view of an exemplary battery assembly for use with a recloser.
Figure 3:
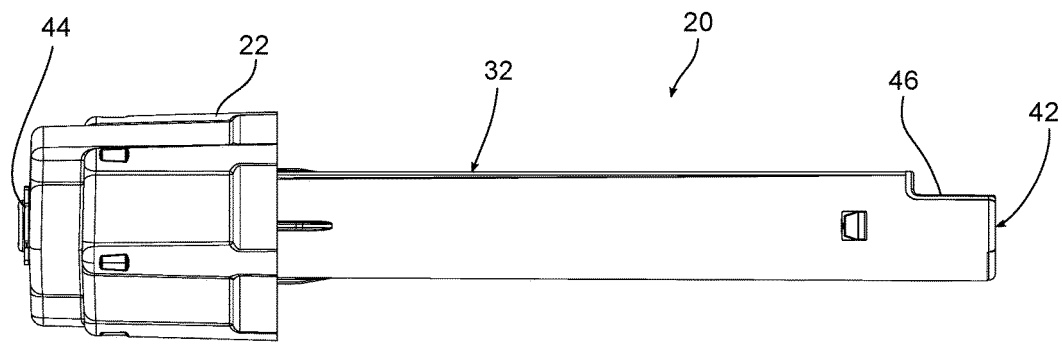
FIG. 3 is a side view of the assembled battery assembly.
Figure 4:
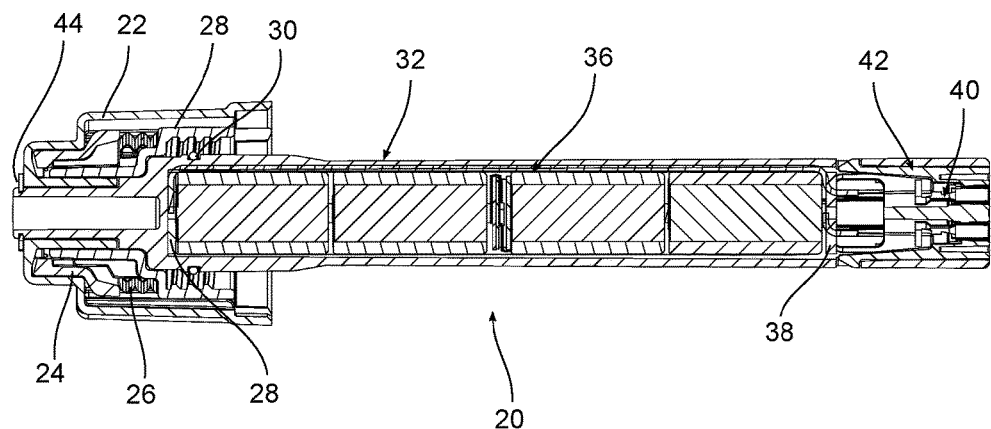
FIG. 4 is a side, sectional view of the battery assembly rotated 90 degrees from FIG. 3.

FIGS. 2-4 show an exemplary embodiment of a battery assembly 20 that includes a cap 22, a ratchet member 24, a biasing member 26, a first connector 28, a seal (e.g. O-ring) 30, a assembly body 32, a first battery pad 34, a battery 36, a second battery pad 38, a set of contacts 40, and a contact casing 42. When assembled, a portion of the assembly body 32 extends through the first connector 28, the biasing member 26, ratchet member 24, and the cap 22 and is held in place by a retainer 44, for example an E-clip. The battery 36 and battery pads 34, 38 are retained in the assembly body 32 and the contact casing 42 includes a detent, such a one allowing a snap-fit connection to the assembly body 32.

As best shown in FIG. 3, the assembly body 32 and the contact casing 42 combine to form a keyed portion 46 having a cross-section different than the outer wall of the assembly body 32. For example, the assembly body 32 may have a substantially cylindrical configuration and the keyed portion 46 may have a substantially flat section. The keyed portion 46 is used to facilitate proper orientation and fit of the assembly body 32 when placed into the battery tube coupled to the recloser 10. As illustrated in FIG. 4, the battery 36 may include one or more individual battery cells in some embodiments.

Figure 5:
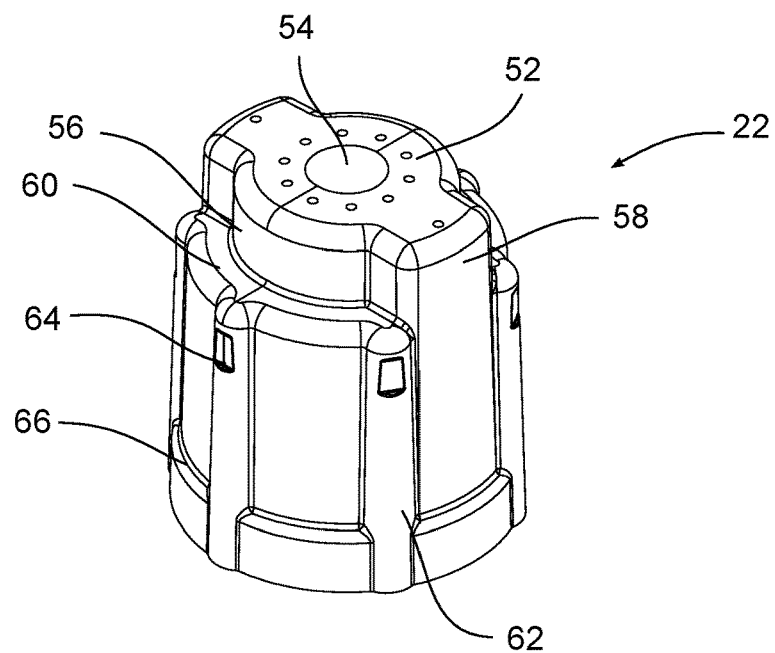
FIG. 5 is a perspective view of an exemplary cap.
Figure 6:
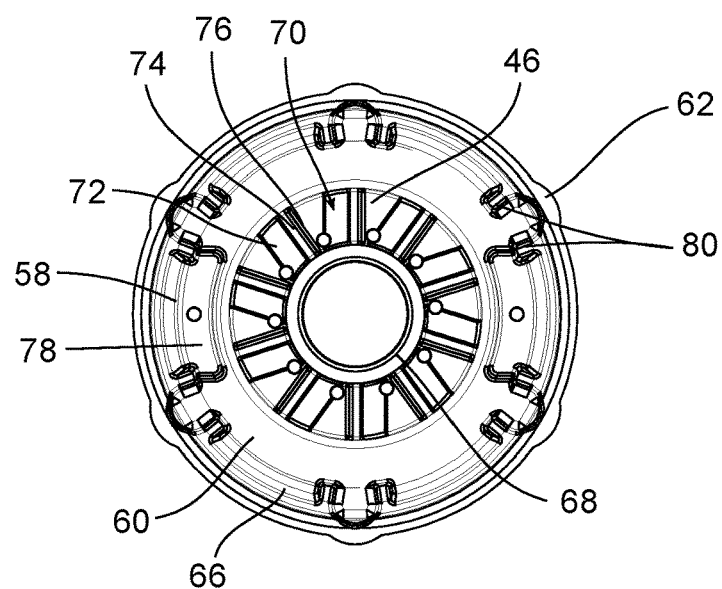
FIG. 6 is a rear view of FIG. 5.
Figure 7:
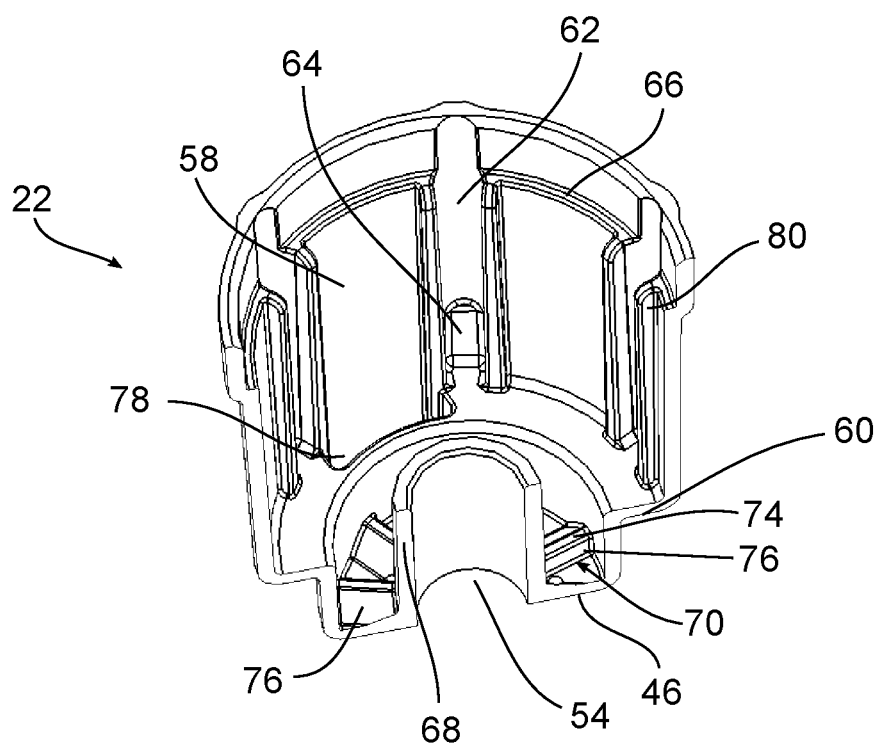
FIG. 7 is a rear, sectional view of FIG. 5.

FIGS. 5-7 show an exemplary embodiment of the cap 22. As shown in FIG. 5, the cap 22 includes a front wall 52, a first section extending from the front wall 52, a second section extending from the first section, and a third section extending from the second section. A central opening 54 extends through the cap for receiving at least a portion of the assembly body 32. In an exemplary embodiment, the assembly body 32 is rotatably connected to the cap by the first connector 28 and secured by the retainer 44.

The first section of the cap 22 includes a substantially cylindrical portion 56 and a pair of shoulders 58 extending on opposites sides across the cylindrical portion 56. The first and second shoulders 58 have a substantially rectangular configuration, although other configurations such as differently shaped extruded portions or indentations such as channels can be used. In an exemplary embodiment, the first and second shoulders 58 extend to the third section. A first ledge 60 is formed between the first section and the second section. The second section includes one or more protrusions 62, with each protrusion having a notch 64. The protrusions 62 can extend to the bottom of the cap and at least partially define an arcuate recessed portion. A second ledge 66 is formed between the second section and the third section.

FIGS. 6 and 7 show the interior of the cap 22. A boss 68 extends from the front wall 46 into the interior of the cap 22 around the central opening 54. The rear portion of the front wall 52 includes a plurality of first teeth 70. The teeth 70 have a substantially right-trapezoidal configuration with an angled side 72, a substantially planar top 74, and a vertical side 76. The teeth 70 mate with teeth of the ratchet member 24 to form a torque-limiting connection that prevents overtightening of the cap 22. A depression 78 is provided adjacent each of the first and second shoulders 58 and a pair of tabs 80 bound the interior of each protrusion 62. The depression 78 and tabs 80 ensure proper placement, a secure fit and robust grip for a utility tool, e.g., a hotstick, during ground installation of the battery.

Figure 8:
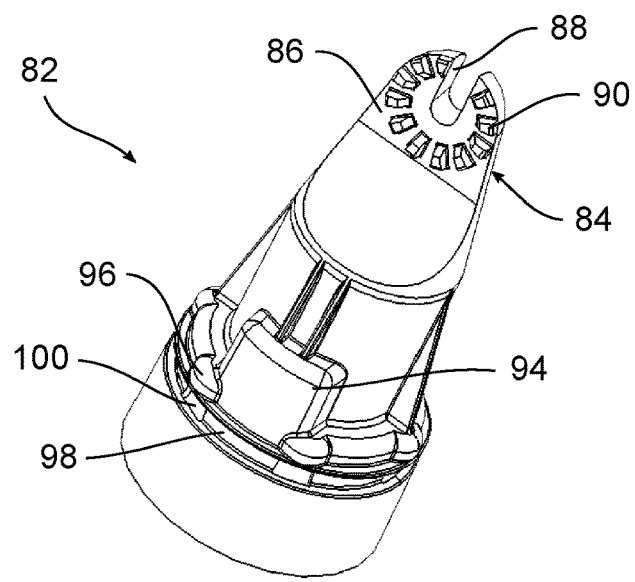
FIG. 8 is a perspective view of an exemplary hot-stick adaptor.

FIGS. 8-11 show an exemplary embodiment of a hot-stick adaptor 82. Hot sticks are used in various power line installations and maintenance procedures to engage live, or energized, devices in a power distribution system. The hot-stick adaptor 82 is configured to connect to the cap 22 and to receive a hot-stick (not shown) such that the hot-stick can be used to install or uninstall the battery assembly 20 to a recloser 10 from the ground. The hot-stick adaptor 82 includes a connecting portion 84 configured to receive a standard hot-stick. For example, as shown in FIG. 8, the connecting portion 84 includes a substantially circular base 86 with a radial slot 88. A plurality of teeth 90 extend from the substantially circular base 86. The teeth are configured to mate with corresponding teeth on a hot stick. In some embodiments, a fastener is utilized with the radial slot 88 to connect the hot-stick to the hot-stick adaptor 82.

The hot-stick adaptor 82 includes one or more features that mate with features of the cap 22. For example, shown in FIG. 9, the hot-stick adaptor 82 includes first and second adapter shoulders 94 at least partially defining open areas configured to receive the cap shoulders 58. The hot-stick adaptor 82 also includes a set of protrusions 96 spaced radially around the hot-stick adaptor 82. The protrusions 96 at least partially define open areas configured to receive the cap protrusions 62. A channel 98 is formed in the hot-stick adaptor 82 having openings 100 that are aligned with the protrusions 62. As best shown in FIG. 10, the openings 100 are also aligned with the notches 64 in the cap protrusions 62. These mating features can rotationally fix the hot-stick adaptor 82 to the cap 22 to provide a secure grip during installation. In one embodiment, an external band 102 is placed in the channel 98 to engage the channel 98 and notches 64 of the cap 22 through the openings 100 to resist axial movement and maintain a firm grip between the hot-stick adaptor 82 and the cap 22. In some embodiments, the band 102 is made from metal and is crimped to the channel 98. In other embodiments, the band 102 is formed from another resilient material, such as a polymer or rubber material.

Figure 9:
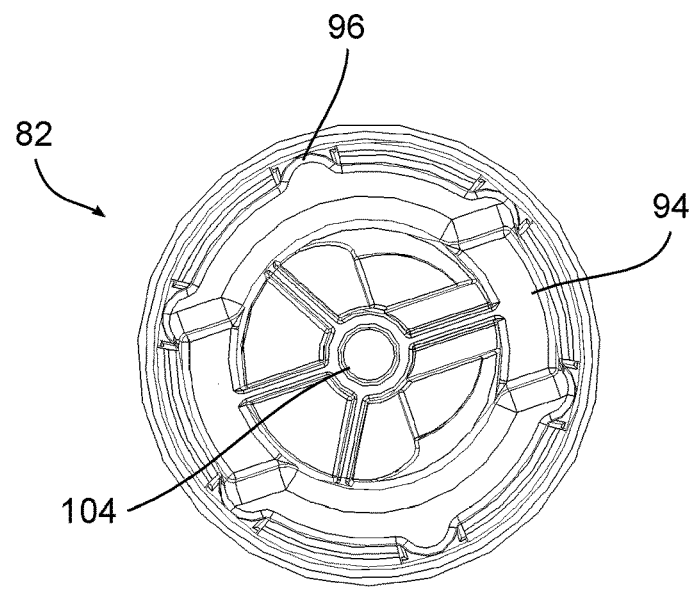
FIG. 9 is a rear view of FIG. 8.
Figure 10:
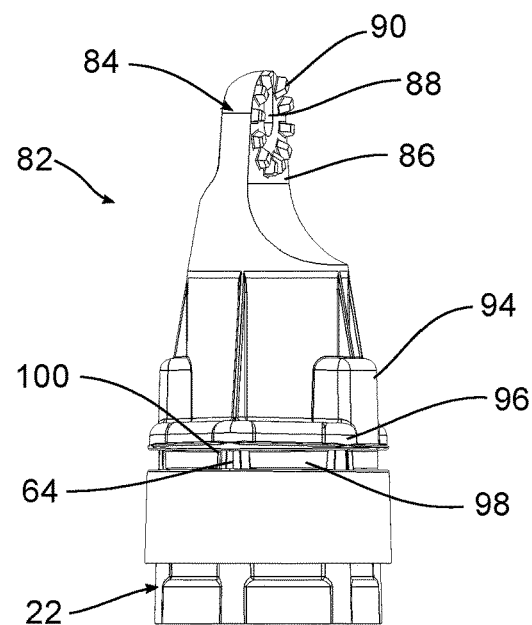
FIG. 10 is a side view of the hot-stick adaptor of FIG. 8 connected to the cap of FIG. 5.
Figure 11:
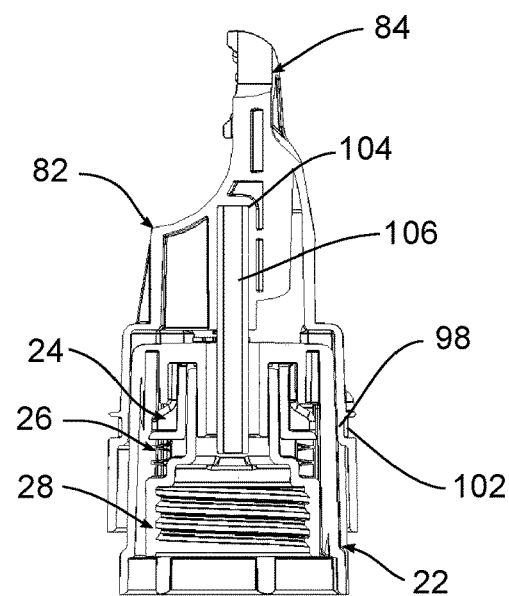
FIG. 11 is a sectional view of FIG. 10 with a band and a spring pin connected to the hot-stick adaptor.

As shown in FIGS. 9 and 11 the interior of the hot-stick adaptor 82 includes a central conduit 104. In one embodiment, when the cap 22 is connected to the assembly body 26, a spring pin 106 is inserted into the conduit 104 and extends into a shaft of the assembly body 36. The spring pin 106 flexes outwardly in a radial direction to provide friction between the hot-stick adaptor 82 and the assembly body 32.

Figure 12:
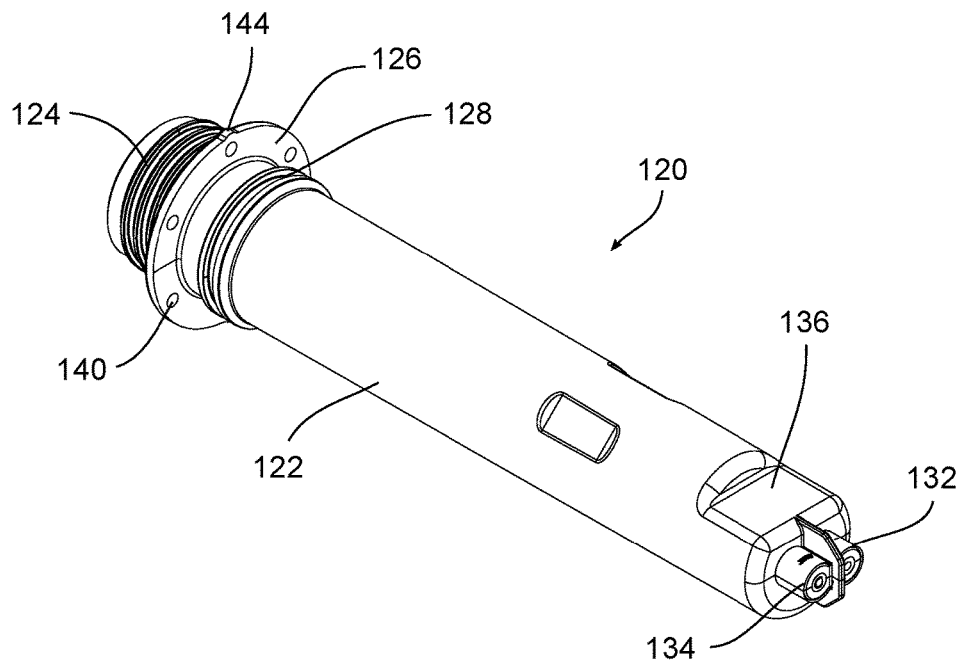
FIG. 12 is a perspective view of an exemplary battery battery tube.
Figure 13:
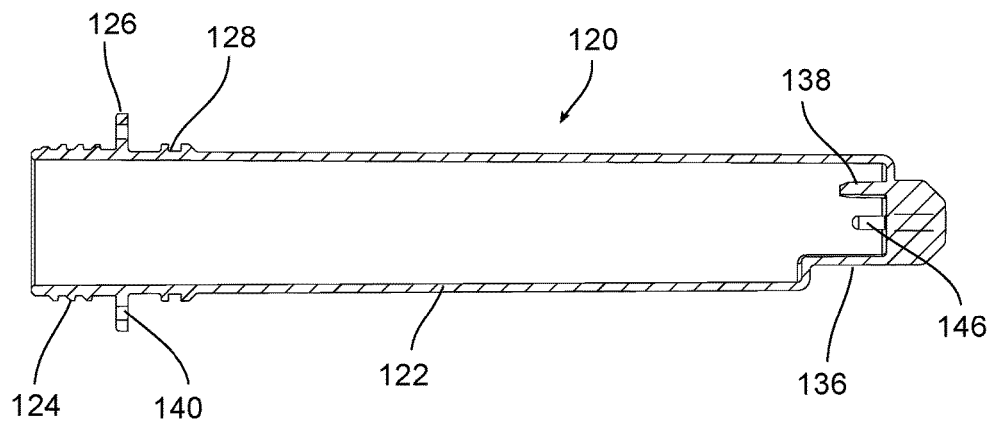
FIG. 13 is a side sectional view of FIG. 12 with the batter tube rotated 180 degrees.
Figure 14:
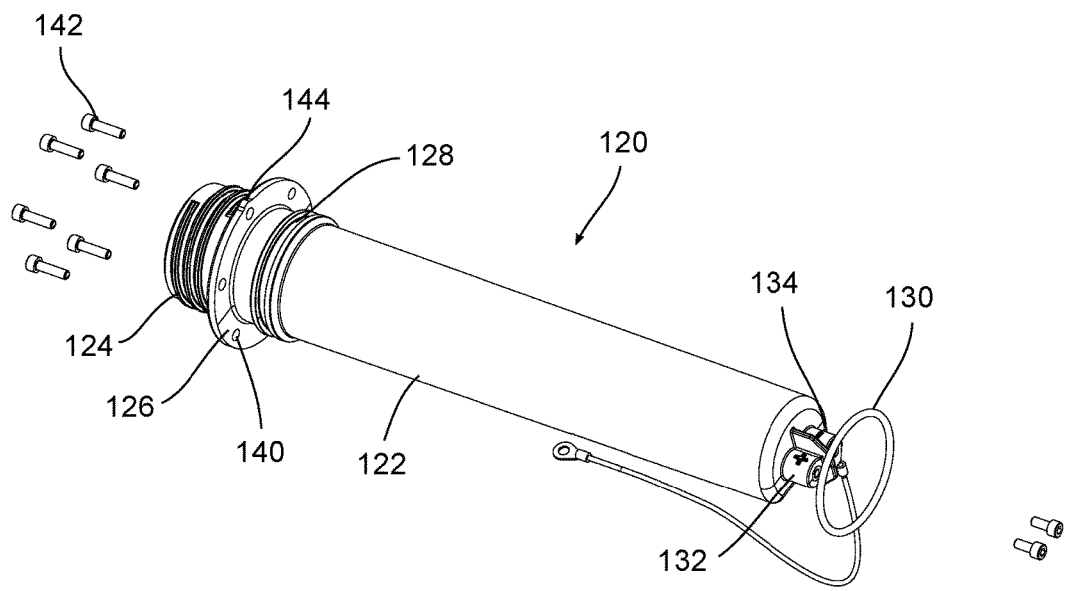
FIG. 14 is a perspective view of the battery tube and fasteners.

According to an exemplary embodiment, the battery assembly 20 is inserted into a battery tube that is connected to the recloser 10. FIGS. 12-14 show an exemplary embodiment of a battery tube 120. The battery tube 120 includes a substantially cylindrical body 122 having an external connector 124, a flange 126, a groove 128 for receiving a seal 130 (e.g., an O-ring), and a contact portion having a positive contact housing 132 and a negative contact housing 134. The external connector 124 mates with the first connector 28 of the battery assembly 20 and the assembly body 32 extending into the battery tube 120. The recloser 10 can further include a battery chamber that is configured to releasably receive the battery tube 120. Additionally, though a cylindrical tube is shown in FIG. 12, the battery tube 120 may be any type of receptacle capable of receiving the battery assembly 20 and allowing power to be supplied from the battery to the circuit interrupting device.

Shown in FIG. 13, the battery tube 120 body includes a keyed portion 136 that mates with the keyed portion 46 of the battery assembly 20. In some embodiments, a protrusion 138 extends from a rear wall into the interior of the body. The protrusion 138 can be configured to mate with an opening in the contact casing 42. The flange 126 has a series of openings 140 that align with corresponding openings in the recloser 10. Fasteners 142, such as screws, are used to connect the battery tube 120 to the recloser 10 through the flange 126 openings 140. In some embodiments, the flange 126 also has one or more protrusions 144 that act as an anti-loosening feature to prevent loosening of the cap 22 due to, e.g., line vibrations or thermal fluctuations. The protrusions 144 have a semi-circular configuration to mate with the openings defined by the rounded protrusions 62 on the cap 22 shown in FIG. 7.

Figure 15:
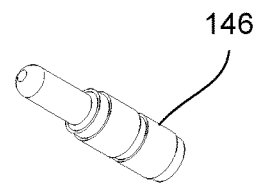
FIG. 15 is a perspective view of an exemplary contact pin.

Referring again to FIG. 14, the contact housings 132, 134, may include a pair of contact pins 146. An example of a contact pin 146 is shown in FIG. 15. A first pin 146 is positioned in the positive contact housing 132 and a second pin 146 is positioned in the negative contact housing 134. When the battery assembly 20 is inserted into the battery tube 120, the contacts pins 146 extend into respective positive and negative terminals 132, 134, in the contact casing 42. Cables can be connected to the contact housings 132, 134, (e.g., through fasteners) to form an electrical connection with the internal component of the recloser 10.

During installation the battery tube 120 is first connected to the recloser 10 and the battery assembly 20 is then inserted into the battery tube 120. The protrusions 144 extending from an outer edge of the flange 126 engage the recesses in the cap 22. This engagement helps to prevent the battery assembly 20 from loosening, such as due to line vibrations or thermal expansion.

In one embodiment, the battery tube 120 is used to install a battery assembly 20 when the recloser 12 is oriented as shown in FIG. 1. In other embodiments, the recloser 10 may be installed in a vertical orientation, where the battery opening is orthogonal to the ground as opposed to parallel to the ground.

FIGS. 16-22 show an exemplary embodiment of an adaptor plate 150 and an adaptor tube 152 used to install the battery assembly 20 in an alternate configuration, such as in a vertical orientation. The adaptor plate 150 is connected to the recloser 10 and to the adaptor tube 152. The adaptor tube 152 is further configured to receive the battery tube 120. The adaptor plate 150 and adaptor tube 152 allow the battery assembly 20 to be oriented substantially parallel to the ground when the battery opening in the recloser 10 is oriented orthogonal to the ground which, for example, may facilitate ground installation of the battery assembly 20 with a hot-stick. In some embodiments, the adaptor plate 150 and adaptor tube 152 is combined into a single unit.

Figure 17:
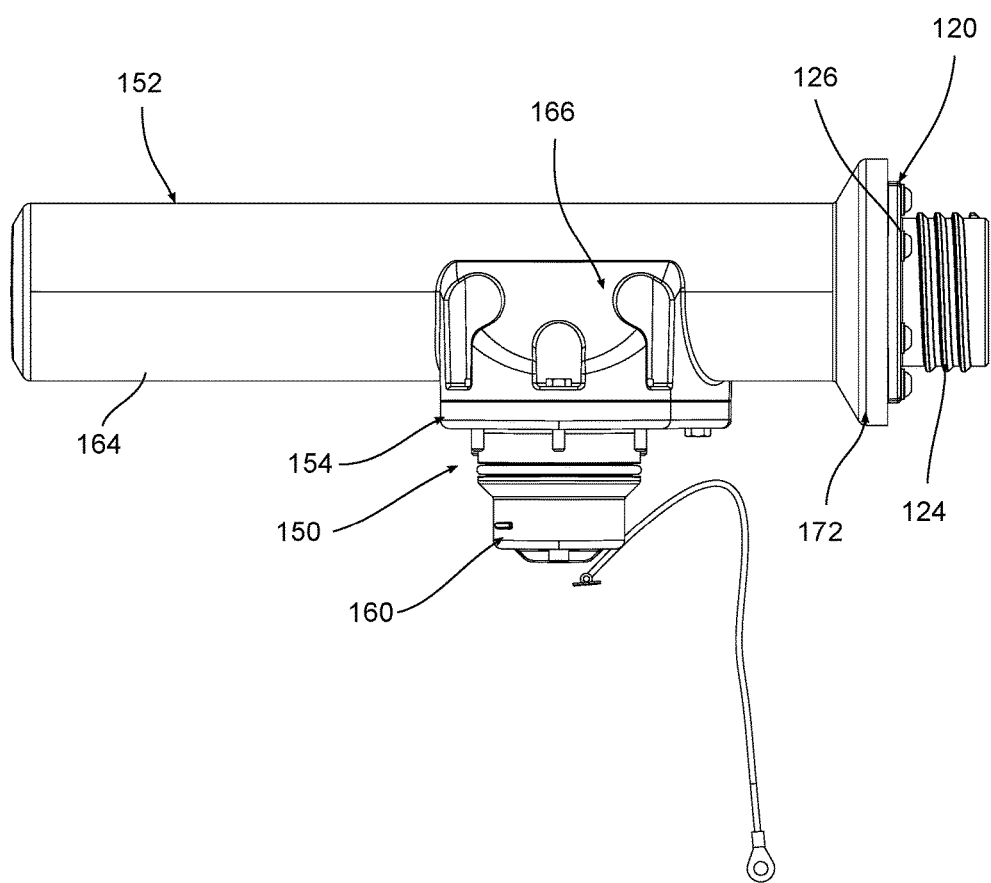
FIG. 17 is a top view of FIG. 16 with the components assembled.

Shown in FIGS. 17-18, the adaptor plate 150 includes a mounting portion 154 having a first circular set of openings 156 around the circumference of the battery tube 120 and an outer set of plate openings 158. One or more of the first circular set of openings 156 and plate opening 158 are used to connect the adaptor plate 150 to the housing of the recloser 10. In an exemplary embodiment, a first portion of the first circular set of openings 156 are used to directly connect the adaptor plate to the recloser 10 and a second portion of the circular set of openings 156 connect to the adaptor tube 152 and the recloser 10. For example, the three circular openings 156 proximate to the outer opens 158 can receive a fastener that extends into the recloser and the remaining three circular openings 156 can receive fasteners that extend through the adaptor tube 152, the adaptor plate 150 and into the recloser 10. In some embodiments, the outer set of openings 158 are used to connect the adaptor tube 152 to the adaptor plate 150.

The adaptor plate 150 also includes a vertical contact portion 160 having a positive terminal 162 and a negative terminal 164 in one embodiment. FIG. 19 shows a cross section of the vertical contact portion 160. The positive and negative terminals of the vertical contact portion 160 may each retain a contact, such as the pass through contact 162 shown in FIGS. 20 and 21.

Figure 16:
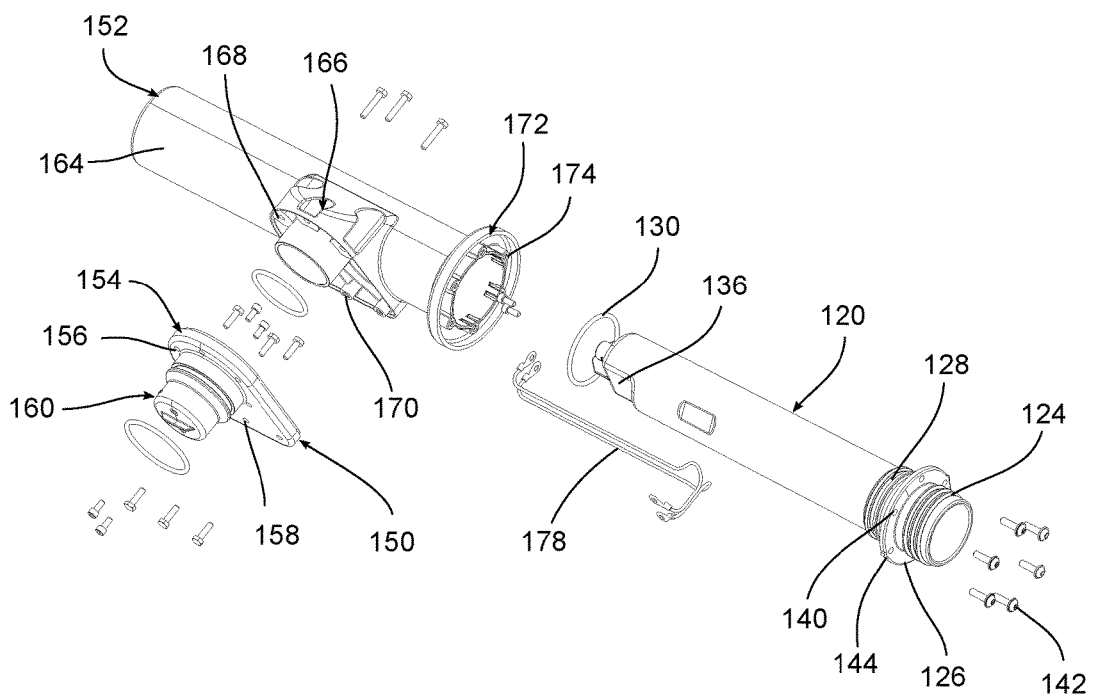
FIG. 16 is an exploded view of an exemplary vertical adaptor assembly.
Figure 22:
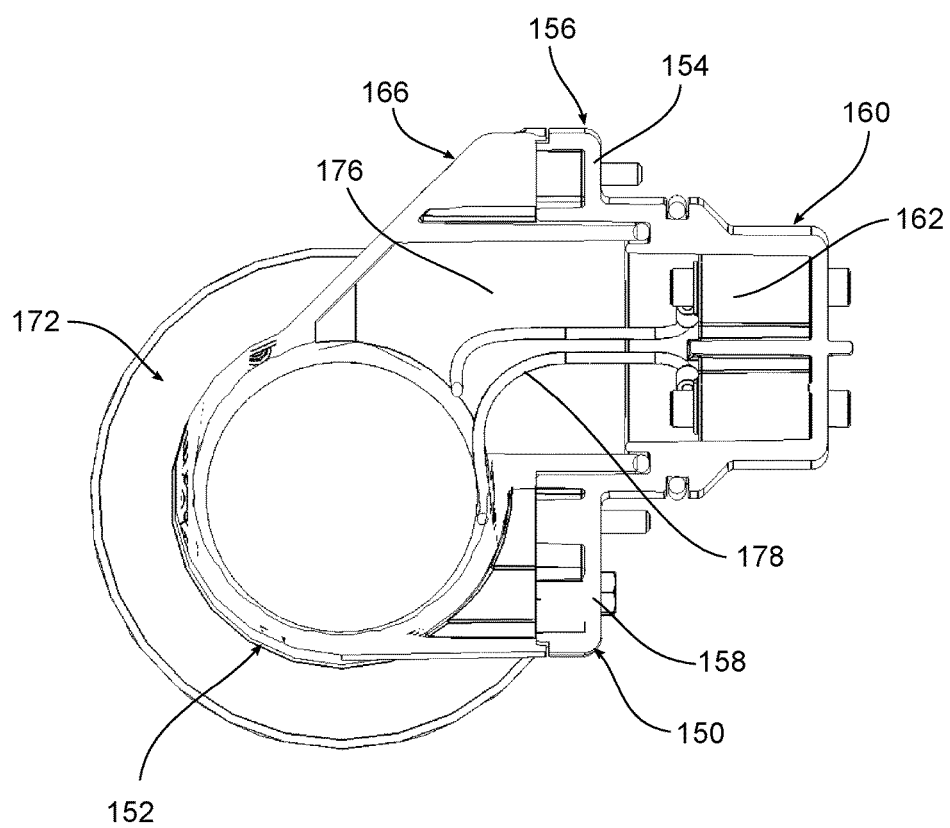
FIG. 22 is a rear, sectional view of the assembly of FIG. 16.

FIGS. 16, 17, and 22 show an exemplary embodiment of the adaptor tube 152 having a substantially cylindrical body 164 and a first mounting portion 166 for connecting the adaptor tube 152 to the adaptor plate 150. The first mounting portion 166 includes a second circular set openings 168 positioned around the circumference of the battery tube 120 that align with the first circular set of openings 156 on the adaptor plate and a set of outer openings 170 that align with the outer set of plate openings 158 on the adaptor plate. The adaptor tube 152 also includes a second mounting portion 172 for connecting the battery tube 120 to the adaptor tube 152. For example, the second mounting portion 172 includes a set of openings 174 that are the same configuration as the recloser openings so that the battery tube 120 can be connected to the adaptor tube 152 through the flange 126 as described with reference to FIGS. 14-15. The adaptor tube 152 includes a passage 176 through the first mounting portion to enable the battery assembly 20 to be electrically connected to the recloser 10.

During installation, the adaptor plate 150 is connected to the recloser 10 and conductors 178 are respectively connected to the positive and negative contacts in the adaptor plate 150 as shown in FIG. 22. In some embodiments, the conductor plate 150 includes a channel for receiving a gasket to form a seal between the conductor plate 150 and the recloser 10. Then, the conductors 178 can be coupled to the adaptor tube 152 and the adaptor tube 152 may be connected to the adaptor plate 150. The conductors 170 are then connected to the contact portion of the battery tube 120, and the battery tube 120 is connected to the adaptor tube 152. The battery assembly 20 is then connected to the battery tube 120 as described in various embodiments above. The recloser 10 may then be installed in a utility network, for example, mounted to a pole in an overhead power distribution system.

The foregoing detailed description of the certain exemplary embodiments has been provided for the purpose of explaining the general principles and practical application, thereby enabling others skilled in the art to understand the disclosure for various embodiments and with various modifications as are suited to the particular use contemplated. This description is not necessarily intended to be exhaustive or to limit the disclosure to the exemplary embodiments disclosed. Any of the embodiments and/or elements disclosed herein may be combined with one another to form various additional embodiments not specifically disclosed. Accordingly, additional embodiments are possible and are intended to be encompassed within this specification and the scope of the appended claims. The specification describes specific examples to accomplish a more general goal that may be accomplished in another way.

As used in this application, the terms "front," "rear," "upper," "lower," "upwardly," "downwardly," and other orientational descriptors are intended to facilitate the description of the exemplary embodiments of the present disclosure, and are not intended to limit the structure of the exemplary embodiments of the present disclosure to any particular position or orientation. Terms of degree, such as "substantially" or "approximately" are understood by those of ordinary skill to refer to reasonable ranges outside of the given value, for example, general tolerances associated with manufacturing, assembly, and use of the described embodiments.

What is claimed:

1. A circuit interrupting device for use within a power distribution system, comprising:
    a housing containing a circuit interrupting mechanism and a battery chamber;
    a battery tube removably connected to the battery chamber; and
    a battery assembly configured to be coupled to the battery tube, the battery assembly comprising,
       an assembly body having a first end and a second end,
       a battery positioned in the assembly body, and
       a cap connected to the assembly body and configured to connect the battery assembly to the battery tube.

2. The circuit interrupting device of claim 1, wherein the cap is removably connected to the battery tube.

3. The circuit interrupting device of claim 1, wherein the battery assembly includes a first keyed portion, and wherein the battery tube includes a second keyed portion configured to mate with the first keyed portion.

4. The circuit interrupting device of claim 1, further comprising a hot-stick adaptor connected to the cap.

5. The circuit interrupting device of claim 4, wherein the cap includes a first shoulder and the hot-stick adaptor includes a second shoulder receiving the first shoulder.

6. The circuit interrupting device of claim 1, wherein the battery tube includes a flange having a plurality of openings.

7. The circuit interrupting device of claim 1, further comprising an adaptor plate connected to the housing and an adaptor tube connected to the adaptor plate, wherein the battery tube is positioned in and connected to the adaptor tube.

8. The circuit interrupting device of claim 7, wherein the adaptor plate has a contact portion extending into the battery chamber and the battery tube has a body extending substantially orthogonal to the contact portion.

9. A circuit interrupting device for use with an electrical power distribution system, comprising:
    a housing including a circuit interrupting device and a battery chamber;
    a battery tube releasably connected to the battery chamber and having a first thread; and
    a battery assembly configured to be inserted into the battery tube, the battery assembly including a cap having second thread configured to mate with the first thread to form a threaded connection, and
    a hot-stick adaptor having an interior receiving at least a portion of the cap and a connecting portion configured to connect to a hot-stick.

10. The circuit interrupting device of claim 9, wherein the connecting portion includes a first set of teeth.

11. The circuit interrupting device of claim 9, wherein the cap includes a protrusion having a notch and hot-stick adaptor includes a channel having an opening aligned with the notch.

12. The circuit interrupting device of claim 11, further comprising a band engaging the channel and the notch.

13. The circuit interrupting device of claim 9, wherein the cap includes a first shoulder and the hot-stick adaptor includes a second shoulder receiving the first shoulder.

14. The circuit interrupting device of claim 11, wherein the hot stick adaptor includes a central conduit extending into the interior, and further comprising a spring pin positioned in the conduit and engaging the battery assembly.

15. A circuit interrupting device system for use with an electrical power distribution system, comprising:
    a housing containing a circuit interrupting device and a battery chamber;
    an adaptor plate configured to be connected to the housing and extend at least partially into the battery chamber;
    an adaptor tube configured to be connected to the adaptor plate;
    a battery tube configured to be connected to the battery chamber and configured to be connected to the adaptor tube; and
    a battery assembly configured to be inserted into the battery tube.

16. The circuit interrupting device of claim 15, wherein the adaptor plate includes a contact portion having a positive contact and a negative contact.

17. The circuit interrupting device of claim 16, further comprising a first conductor connected to the positive contact and extending through the adaptor tube and connected to the battery tube and a second conductor connected to the negative contact and extending through the adaptor tube and connected to the battery tube.

18. The circuit interrupting device of claim 15, wherein the battery chamber has a first longitudinal axis and the adaptor tube has a second longitudinal axis, and wherein the second longitudinal axis is orthogonal to the first longitudinal axis when the adaptor tube is connected to the housing.

19. The circuit interrupting device of claim 15, wherein the battery tube includes a flange having a series of openings to connect the battery tube to the adaptor tube or to the housing.

20. The circuit interrupting device of claim 15, wherein the battery assembly is threadably connected to the battery tube and the battery tube is selectively connected to the housing or to the adaptor tube by a fastener.

* * * * *